(12) United States Patent
McLamb (10) Patent No.: US 10,021,888 B2
(45) Date of Patent: Jul. 17, 2018

(54) VERTICAL SMOKER AND COOKER FOR FOOD

(71) Applicant: Curtis Glenn McLamb, Sugar Hill, GA (US)

(72) Inventor: Curtis Glenn McLamb, Sugar Hill, GA (US)

(*) Notice: Subject to any disclaimer, the term of this patent is extended or adjusted under 35 U.S.C. 154(b) by 0 days.

(21) Appl. No.: 15/436,584

(22) Filed: Feb. 17, 2017

(65) Prior Publication Data
US 2017/0265490 A1 Sep. 21, 2017

Related U.S. Application Data

(60) Provisional application No. 62/390,033, filed on Mar. 17, 2016.

(51) Int. Cl.
*A47J 37/12* (2006.01)
*A23B 4/052* (2006.01)

(52) U.S. Cl.
CPC .......... *A23B 4/052* (2013.01); *A23V 2002/00* (2013.01)

(58) Field of Classification Search
CPC ........ A23B 4/044; A23B 4/052; A47J 37/067; A47J 37/07; A47J 37/0704
USPC .................................................. 99/444, 481
See application file for complete search history.

(56) References Cited

U.S. PATENT DOCUMENTS

| | | | | |
|---|---|---|---|---|
| 5,460,159 A | * | 10/1995 | Bussey | A47J 37/0704 126/25 R |
| 6,502,504 B1 | * | 1/2003 | Gschwind | A47J 37/0682 99/400 |
| 6,913,011 B1 | * | 7/2005 | Snider | A47J 37/0704 126/25 R |
| 8,730,038 B2 | * | 5/2014 | Durian | F24C 7/082 126/21 A |
| 2002/0166460 A1 | * | 11/2002 | O'Shea | A23B 4/044 99/482 |
| 2009/0004348 A1 | * | 1/2009 | Silva | A23B 4/044 426/315 |
| 2012/0111205 A1 | * | 5/2012 | Coutts | A47J 37/0682 99/341 |
| 2014/0130683 A1 | * | 5/2014 | Ahmed | A23B 4/052 99/473 |

FOREIGN PATENT DOCUMENTS

EP 0099551 A2 * 2/1984 ............ A47J 37/067

* cited by examiner

*Primary Examiner* — Dana Ross
*Assistant Examiner* — Brandon Harvey
(74) *Attorney, Agent, or Firm* — Asgaard Patent Services, LLC; F. Wayne Thompson, Jr.

(57) ABSTRACT

Implementations of a vertical smoker and cooker for food are provided. In some implementations, the vertical smoker and cooker may be configured to cook and smoke food using charcoal briquettes and wood chips while maintaining a constant cooking temperature within the cooking chamber. In some implementations, the vertical smoker and cooker may be configured to protect the contents of the cooking chamber from direct exposure to the radiant heat coming from the fire box and prevent meat drippings from falling into the fire box. In some implementations, the vertical smoker and cooker may comprise a housing having an interior cooking chamber accessible through a first door, and a fire box chamber accessible through a second door, and an array of drip guides positioned between the cooking chamber and the fire box chamber.

36 Claims, 7 Drawing Sheets

VERTICAL SMOKER AND COOKER FOR FOOD

CROSS REFERENCE TO RELATED APPLICATION

This application claims the benefit of U.S. patent application Ser. No. 62/390,033, which was filed on Mar. 17, 2016, and is incorporated herein by reference in its entirety.

TECHNICAL FIELD

This disclosure relates to implementations of a vertical smoker and cooker for food, and more particularly, to a vertical smoker and cooker configured to burn solid fuel and use direct radiant heat to circulate air throughout the cooking chamber and minimize the temperature variations therein.

BACKGROUND

In general, the problem with using solid fuel in a vertical smoker and cooker is that direct radiant heat is not desirable for slow cooking meats or barbecue. Also, carcinogens may form on the meat if drippings are allowed to drop onto hot burning embers. A layer of metal or stone is sometimes used to reduce the negative effects of direct radiant heat on slow cooking meats but does little to prevent the meat drippings from producing carcinogen causing smoke when they fall on a hot surface.

In some implementations, the present invention may include an array of drip guides that are arranged to catch and direct the flow of meat drippings away from the burning embers positioned thereunder while still allowing heat and smoke to rise therebetween. Further, the drip guides may be configured to cool the surface that the meat drippings fall onto and to channel the drippings into a collection pail that sits in the coolest portion of the fire box chamber.

Some smoker and cooker designs are configured to vent exhaust gasses from the lowest portion of the cooking chamber as a way to generate the effects of natural convection. The amount of turbulence generated by venting exhaust gasses in this manner is very limited and inefficient because the total amount of warm air in circulation must be replaced by cold air entering the enclosed cooking chamber.

In some implementations, the present invention may be configured to generate turbulence therein as a result of the differential thermals traveling through the array of drip guides. In some implementations, this turbulence may be generated even when the provided combustion air blower is not running. This turbulence creates ample air flow to spread heat and/or smoke evenly throughout the cooking chamber.

In general, it is well known by those of ordinary skill in the art, that a PID (proportional-integral-derivative) controller is an ideal method of regulating the temperature within a solid fuel cooking system. After-market, add-on PID controllers configured for attachment to a variety of different grills and/or smokers are available. These after-market PID controllers are optimized to work with a variety of cooker systems and are typically not as efficient as a PID controller that has been optimized for use with a specific size and/or design of cooker system.

In some implementations, the present invention may use a PID controller which has been optimized for use therewith. Further, in some implementations, the PID controller may include a digital temperature display showing the internal temperature of the cooking chamber and/or the desired set-point temperature. The temperature may be displayed in degrees Fahrenheit and/or Celsius.

Using a solid fuel source (e.g., charcoal briquettes) for cooking and simultaneously heating wood chips to create a flavorful smoke is difficult. Once ignited, the solid fuel can reach a temperature that will ignite wood chips, even with a metal barrier positioned therebetween.

Implementations of the present invention are configured to solve this problem by controlling the amount and rate at which combustion air is introduced into the fire box, and through the use of novel wood chip trays. As a result, the interior of the wood chip trays may be kept from rising above ~400 degrees Fahrenheit, which is below the ignition point of most wood chips but still results in flavorful smoke.

Prior art smoker and cookers that rely on solid fuel often require regular intervention on the part of the user during operation, for example, adding more fuel and/or using various controls to maintain a desirable cooking temperature.

Implementations of the present invention are configured to operate for up to 16 hours without user intervention after initial set up. In some implementations, the user needs to load the fire box with charcoal briquettes or another solid fuel, load the wood chip trays with wood chips (e.g., hickory), ignite a first portion of the solid fuel, enter the desired set-point temperature for cooking and/or smoking into the PID controller, and position meat and/or other food items on food racks positioned within the cooking chamber.

Wood chips, such as hickory, are frequently used to add a smoky flavor to food being cooked and/or smoked. Unfortunately, many smoker and cooker systems are unable to prevent the wood chip from nearing and/or reaching their combustion temperature at which point the smoke produced is undesirable for adding flavor to the meat.

Implementations of the present invention are configured to keep wood chips used therewith from generating smoke until the solid fuel positioned adjacent thereto starts to burn. The temperature of the wood chips adjacent the burning solid fuel rises to a desired temperature for optimal smoke flavor and is kept from overheating by an up draft that travels through a divider positioned within each wood chip tray. As an area of solid fuel burns out, the wood chips cool back down and offer little or no additional flavor. This is a process which continues throughout the duration of the cooking process and/or until the solid fuel has been exhausted.

Accordingly, it can be seen that needs exist for a vertical smoker and cooker for food. It is to the provision of a vertical smoker and cooker that is configured to address these needs, and others, that the present invention is primarily directed.

SUMMARY OF THE INVENTION

Implementations of a vertical smoker and cooker for food are provided. In some implementations, the vertical smoker and cooker may be configured to cook and/or smoke food using charcoal briquettes and/or wood chips. In some implementations, a proportional-integral-derivative controller (a PID controller) may be used to maintain a constant cooking and/or smoking temperature within the cooking chamber throughout the cooking duration. In some implementations, the vertical smoker and cooker may be configured to spread heat and/or smoke evenly throughout the cooking chamber. In some implementations, the vertical smoker and cooker may be configured to protect the contents of the cooking chamber from direct exposure to the radiant heat coming from the fire box. In some implementations, the vertical smoker and cooker may be configured to prevent meat drippings from falling into the fire box.

In some implementations, the vertical smoker and cooker may comprise a housing having an interior cooking chamber accessible through a first door, and a fire box chamber accessible through a second door. In some implementations, the vertical smoker and cooker may further comprise an array of drip guides positioned between the cooking chamber and the fire box chamber. In some implementations, the fire box chamber is positioned below the cooking chamber.

In some implementations, the housing may include an exhaust pipe in fluid communication with an upper portion of the interior cooking chamber. In some implementations, the exhaust pipe may be positioned and configured to vent excess gas and/or smoke from the upper portion of the cooking chamber.

In some implementations, a first and/or a second food rack may be positioned within the interior cooking chamber. In this way, fish, poultry, and/or other meats may be positioned within the vertical smoker and cooker.

In some implementations, the vertical smoker and cooker may further comprise a PID (proportional-integral-derivative) controller. In some implementations, the PID controller may be configured to monitor and/or control the temperature within the cooking chamber. In some implementations, the PID controller may be configured to display the set-point temperature and/or the internal temperature of the cooking chamber, using the Fahrenheit and/or Celsius temperature scales.

In some implementations, the array of drip guides may be configured to catch and direct the flow of meat drippings away from the burning embers in the fire box and into a collection pail positioned within the fire box chamber. In some implementations, the array of drip guides is configured to prevent the contents of the cooking chamber from being exposed to the direct radiant heat coming from the fire box.

In some implementations, each drip guide comprises a top portion and a bottom portion that are configured to form a hollow tube when assembled. In some implementations, each drip guide may be configured to create a chimney effect (or airflow) therein. Airflow through the hollow passage of each drip guide serves to cool the top portion of a drip guide and creates turbulence within the cooking chamber. In this way, through convection, the heated air is able to evenly distribute throughout the cooking chamber.

In some implementations, the fire box is configured to hold charcoal briquettes or other solid fuel, as well as the wood chip trays. In some implementations, the fire box defines a channel therein that is configured to contain charcoal briquettes and/or another solid fuel source. In some implementations, the channel may be formed between the bottom and sidewalls of the fire box and the sidewalls of the wood chip trays positioned therein. In some implementations, igniting one or more pieces of solid fuel (e.g., charcoal briquettes) positioned in a first end of the channel initiates a chain reaction in which adjacent pieces of solid fuel will ignite in a slow and orderly manner as fresh combustion air is introduced into the fire box chamber.

In some implementations, each wood chip tray may comprise a housing, a wood chip divider, and a removable lid.

In some implementations, the bottom and four sidewalls of a housing define a narrow channel configured to receive a wood chip divider therein.

In some implementations, each wood chip divider may include a first angled sidewall and a second angled sidewall.

In some implementations, a wood chip divider may have the general cross-sectional profile of an inverted "V". In some implementations, as solid fuel (e.g., charcoal briquettes) positioned along at least one sidewall of the housing of a wood chip tray burns, heat is conducted through the sidewall of the wood chip tray, through the wood chips, and through the divider. In some implementations, as the air within the interior cavity between the angled sidewalls of the divider heats up, cooler air is pulled up into the interior cavity as the warmer air exits through the plurality of openings positioned along the apex of the divider. In this way, the wood chips may be prevented from combusting (i.e., catching fire).

In some implementations, the removable lid for a wood chip tray may include a plurality of air holes therethrough. In some implementations, the air holes may be offset to partially or completely cover the plurality of openings through the apex of the divider. In this way, the temperature within the wood chip tray, and thereby the wood chips, may be increased when smoking foods at lower temperatures.

DETAILED DESCRIPTION

Figure 1:
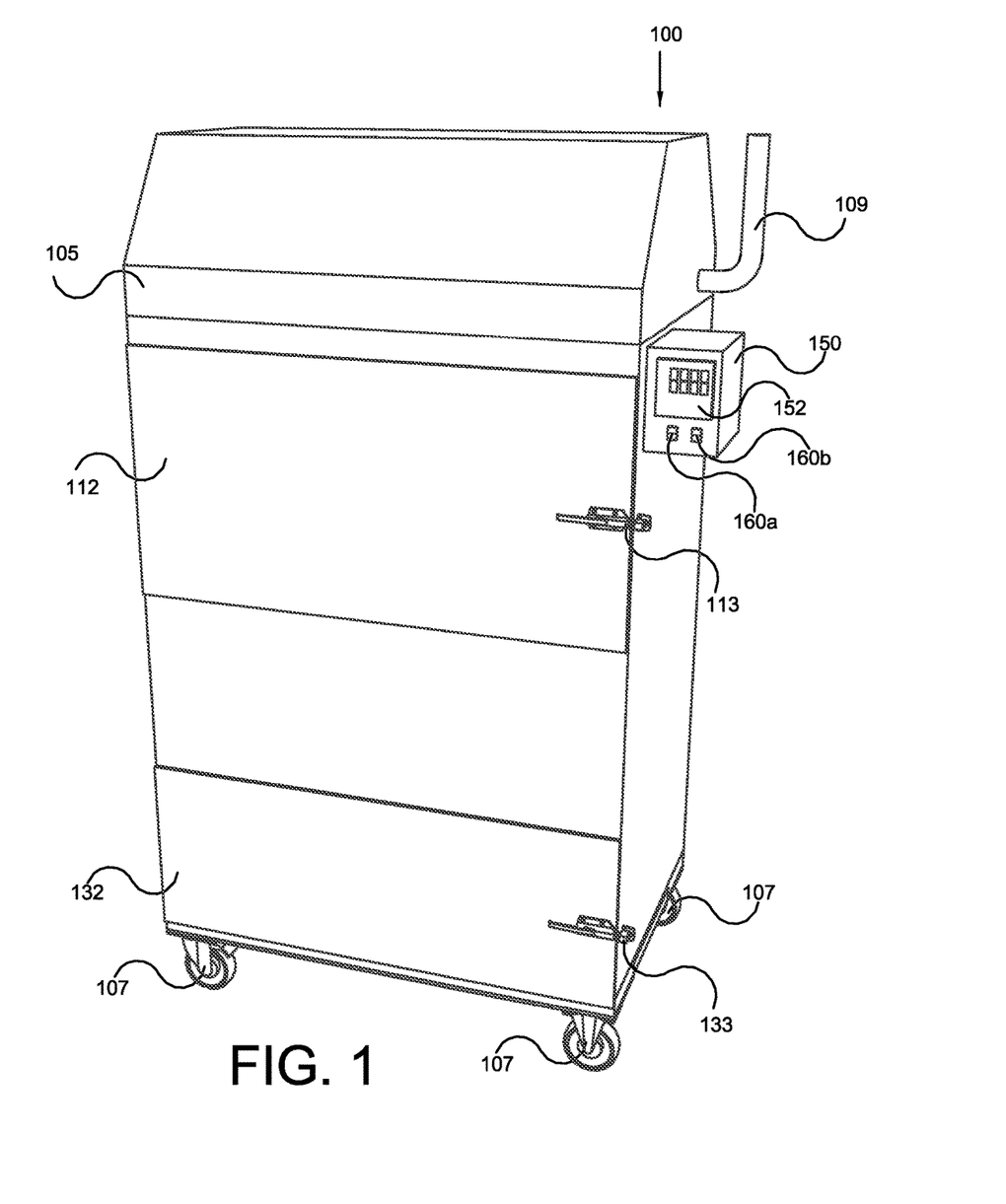
FIG. 1 illustrates a front perspective view of a vertical smoker and cooker for food according to the principles of the present disclosure; the cooking chamber and fire box doors are closed.
Figure 2:
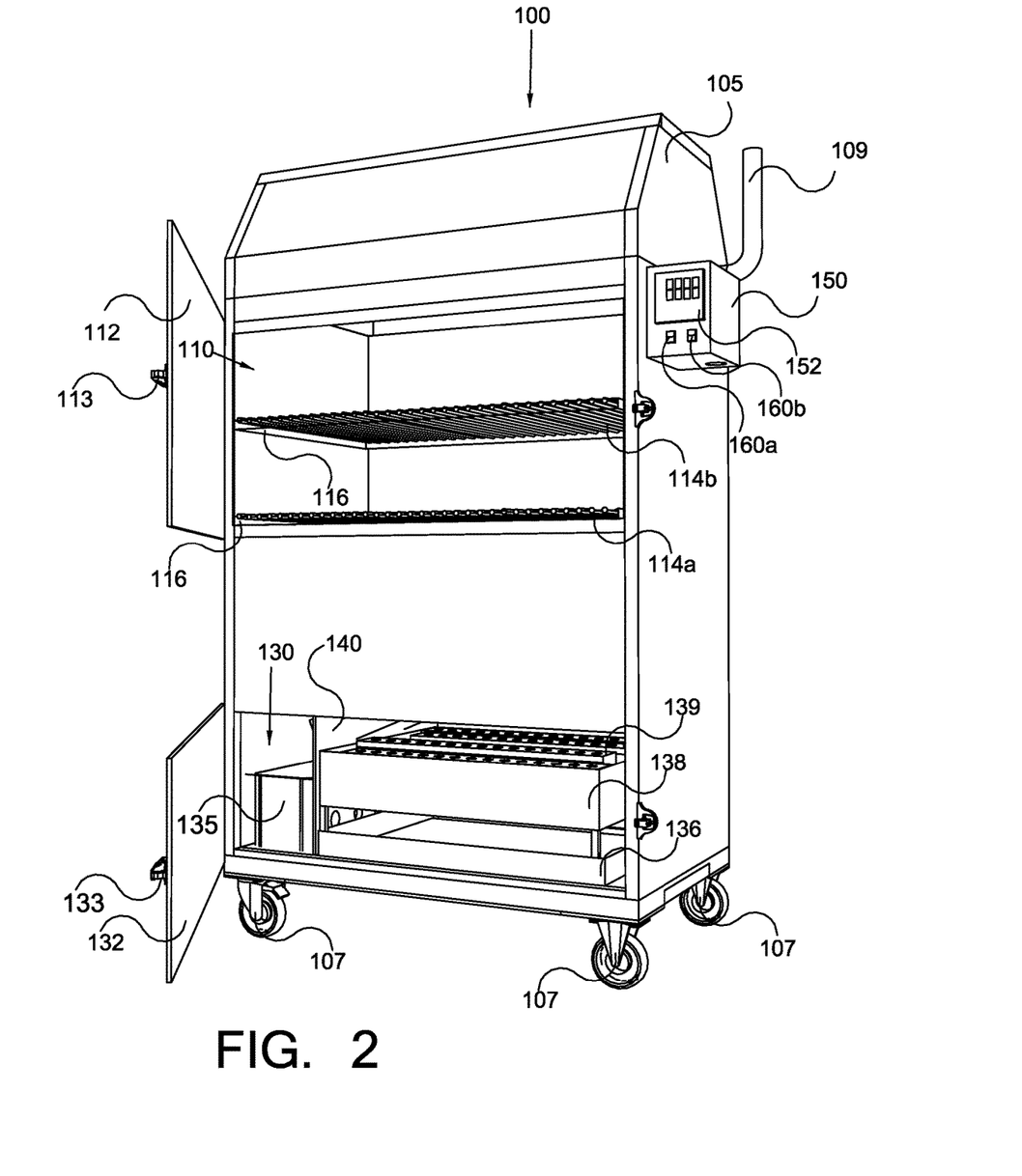
FIG. 2 illustrates the vertical smoker and cooker shown in FIG. 1; the cooking chamber and fire box doors are open.
Figure 4:
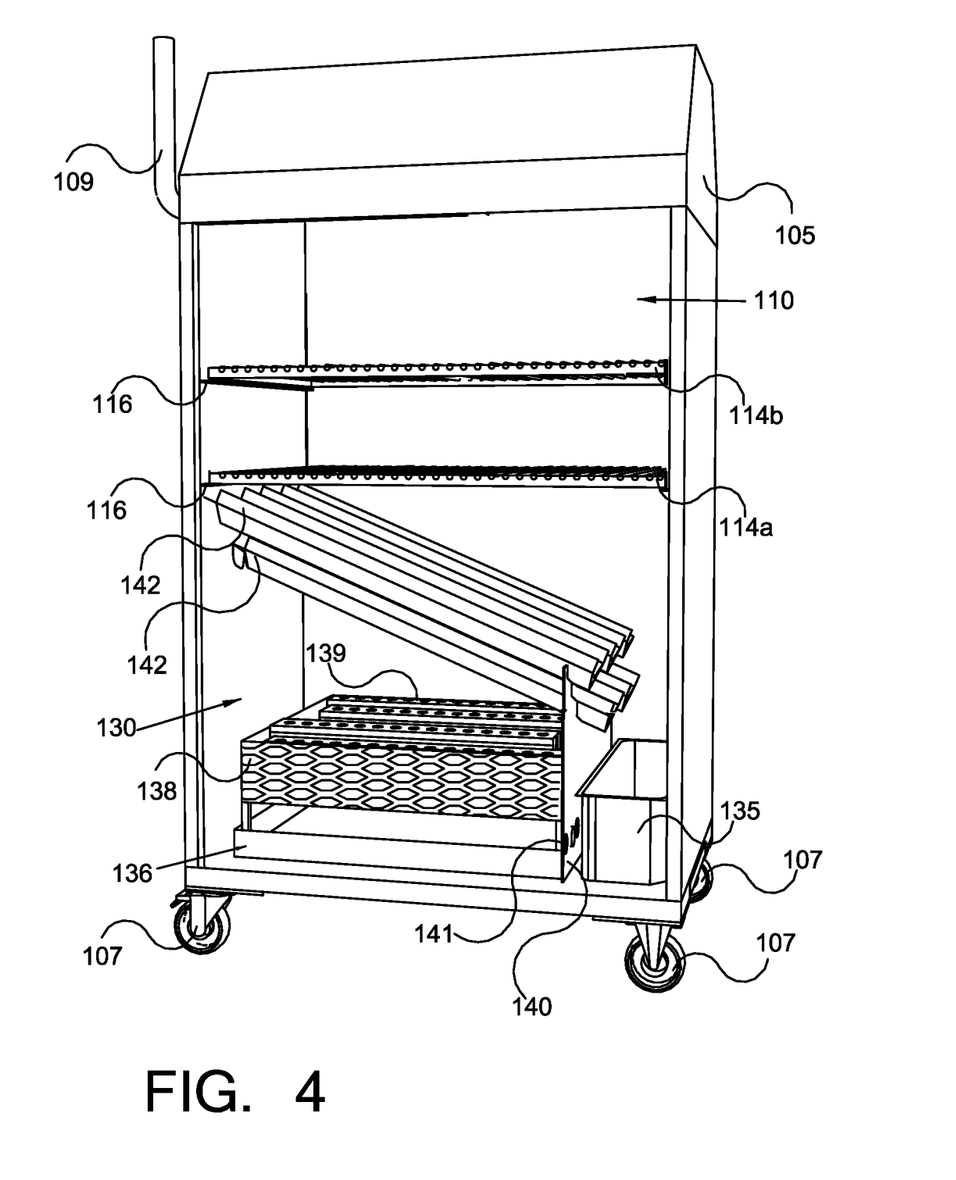
FIG. 4 illustrates a rear side view of the vertical smoker and cooker shown in FIG. 1; the rear sidewall has been removed to reveal the interior thereof.

FIGS. 1, 2 and 4 illustrate an example vertical smoker and cooker for food 100 according to the principles of the present disclosure. In some implementations, the vertical smoker and cooker 100 may be configured to cook and/or smoke food using charcoal briquettes and/or wood chips. In some implementations, a proportional-integral-derivative controller 150 (a PID controller) may be used to maintain a constant cooking and/or smoking temperature within the cooking chamber 110 throughout the cooking duration. In some implementations, the vertical smoker and cooker 100 may be configured to spread heat and/or smoke evenly throughout the cooking chamber 110. In some implementations, the vertical smoker and cooker 100 may be configured to protect the contents of the cooking chamber 110 from direct exposure to the radiant heat coming from the fire box 138. In some implementations, the vertical smoker and cooker 100 may be configured to prevent meat drippings from falling into the fire box 138.

As shown in FIGS. 1 and 2, in some implementations, the vertical smoker and cooker 100 may comprise a housing 105 having an interior cooking chamber 110 accessible through a first door 112, and a fire box chamber 130 accessible through a second door 132. In some implementations, the vertical smoker and cooker 100 may further comprise a fire box 138, four wood chip trays 139, and a plurality of drip guides 142 (see, e.g., FIG. 4).

In some implementations, the housing 105, the first door 110, and/or the second door 112 may be insulated. In some implementations, the housing 105, the first door 112, and/or the second door 132 may be comprised of an inner layer of material (e.g., a sheet of metal) and an outer layer of material (e.g., a sheet of metal) having a layer of insulation positioned therebetween.

As shown in FIG. 1, in some implementations, the first door 112 and the second door 132 may include a first door handle with a latch mechanism 113 and a second door handle with a latch mechanism 133, respectively, thereon. In this way, each door 112, 132 may be opened and/or secured shut. In some implementations, the housing 105 may further comprise four casters 107 mounted on a bottom side thereof and a pull handle on a side thereof (see, e.g., FIG. 1). In this way, the vertical smoker and cooker 100 may be moved and easily relocated.

As shown in FIG. 1, in some implementations, the housing 105 may include an exhaust pipe 109 in fluid communication with an upper portion of the interior cooking chamber 110. In some implementations, the exhaust pipe 109 may be positioned and configured to vent gas and/or smoke from the upper portion of the cooking chamber 110. In some implementations, the exhaust pipe 109 may be connected to an exhaust system when used for indoor cooking.

As shown in FIG. 2, in some implementations, a first and/or a second food rack 114a, 114b may be positioned within the interior cooking chamber 110. In this way, fish, poultry, and other meats may be positioned within the vertical smoker and cooker 100. In some implementations, each food rack 114a, 114b may be configured to slide in and out on slide rails 116 positioned within the cooking chamber 110. In some implementations, there may be more than two food racks 114 positioned within the cooking chamber 110.

As shown in FIGS. 1 and 2, in some implementations, the vertical smoker and cooker 100 may further comprise a PID (proportional-integral-derivative) controller 150. In some implementations, the PID controller 150 may be mounted to a side of the housing 105 (see, e.g., FIG. 2). In some implementations, the PID controller 150 may be configured to monitor and/or control the temperature within the cooking chamber 110. In some implementations, the PID controller 150 may be configured to display the set-point temperature and/or the internal temperature of the cooking chamber 110, using the Fahrenheit and/or Celsius temperature scales.

Figure 3A:
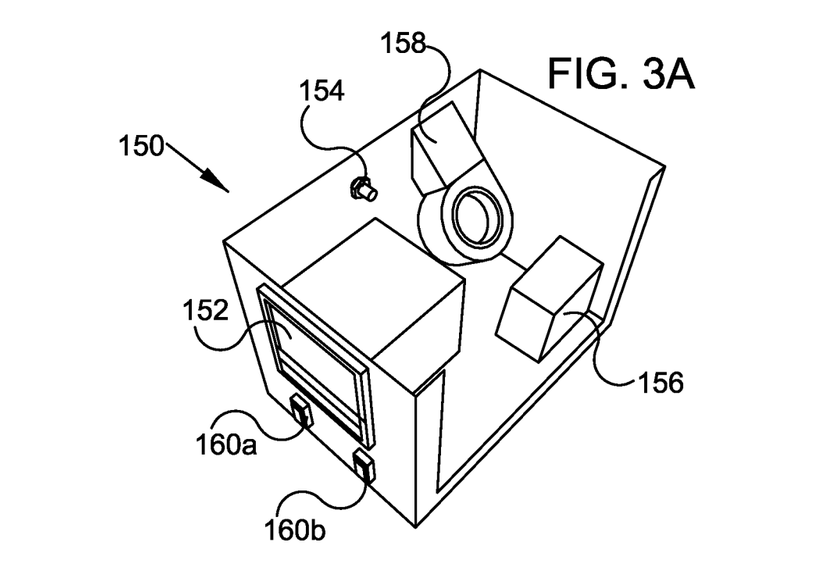
FIGS. 3A and 3B illustrate an example housing, internal components, and electrical schematic for a PID controller according to the principles of the present disclosure.
Figure 3B:
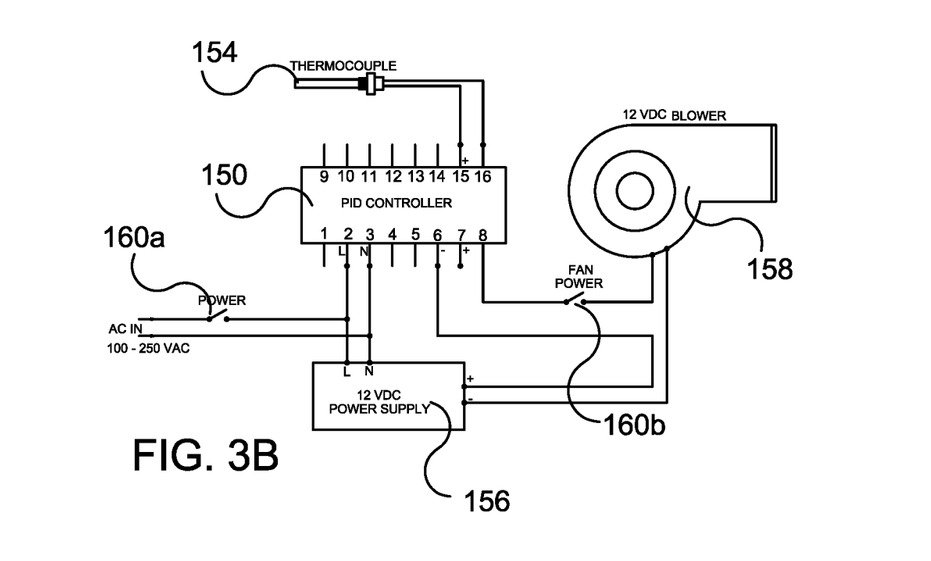

As shown in FIGS. 3A and 3B, in some implementations, the PID controller 150 may comprise a housing 105 that includes a display 152, a thermocouple 154, a 12V DC power supply 156, a combustion air blower 158, a first switch 160a, and/or a second switch 160b.

In some implementations, the PID controller 150 may be configured to proportionally control the "on-time" and/or "the off-time" of the combustion air blower 158. In this way, after the internal cooking chamber 110 is heated to the set-point temperature, the air blower 158 may be used to maintain that temperature within the internal cooking chamber 110. In some implementations, the set-point temperature within the cooking chamber 110 may be maintained by continually readjusting the percentage of "on time" of the combustion air blower 158.

In some implementations, the PID controller 150 may include a solid-state relay (SSR) and/or an electromechanical relay that is used to control the flow of current to the combustion air blower 158.

Figure 8:
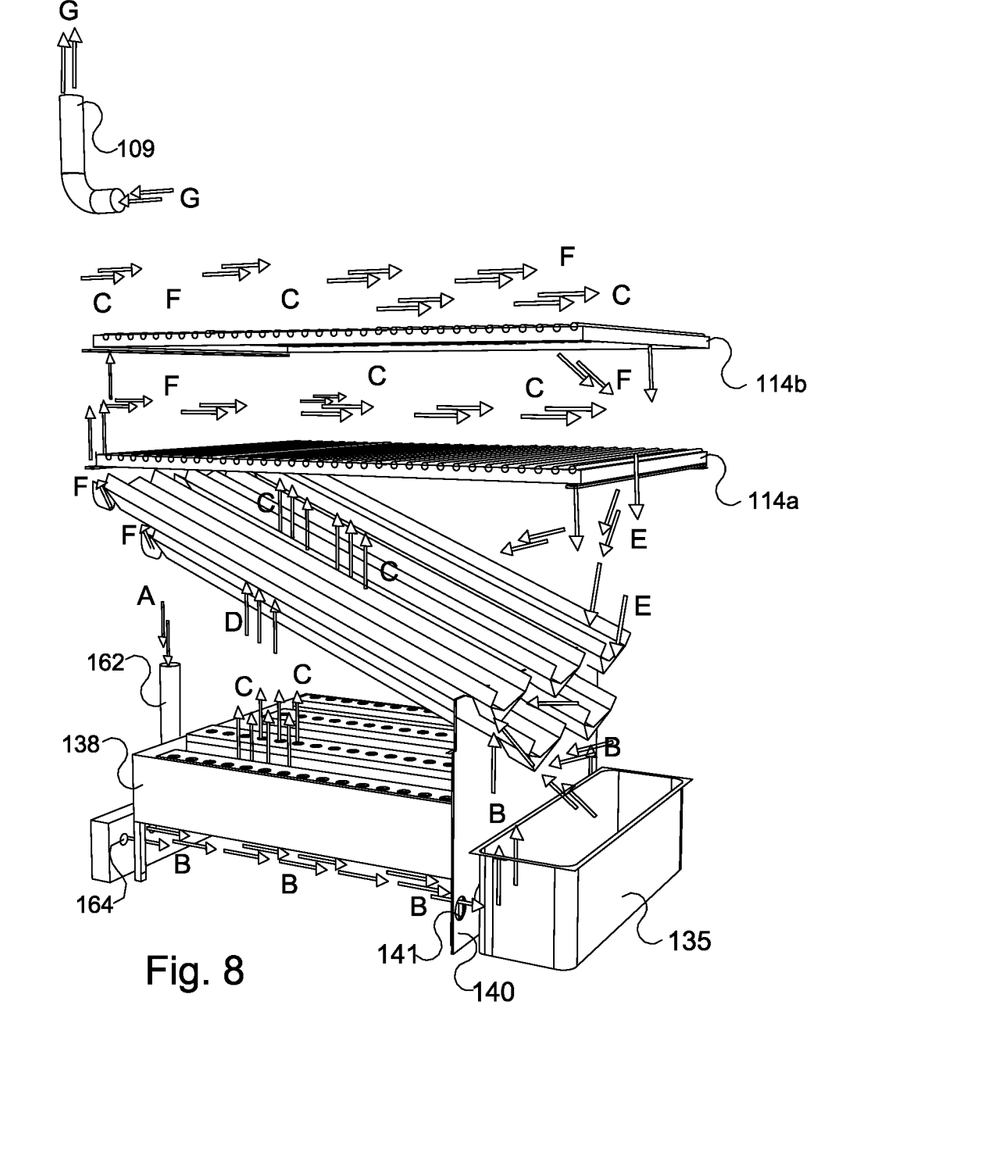
FIG. 8 illustrates thermal air flow within the interior of the vertical smoker and cooker according to the principles of the present disclosure.

In some implementations, a metal tube 162 may extend from the combustion air blower 158, through an insulated sidewall of the housing 105, and into the diffuser 164 (see, e.g., FIG. 8). In this way, the combustion air blower 158 may be used to introduce air into the fire box chamber 130.

In some implementations, the thermocouple 154 may be mounted on an interior side of the PID controller's 150 housing and extend through a sidewall of the housing 105, near the top of the interior cooking chamber 110 (see, e.g., FIG. 1). In some implementations, the thermocouple 154 may be used to detect temperature and provide feedback to the PID controller 150 related to the temperature within the cooking chamber 110.

In some implementations, the provided 12V DC power supply 156 may be configured to reduce the incoming AC voltage down to a working voltage and convert it to a DC voltage suitable for use by the combustion air blower 158 (see, e.g., FIG. 3B).

As shown in FIG. 3A, in some implementations, the first switch 160a and/or the second switch 160b may be positioned on the face of the PID controller 150 below the display 152. In some implementations, the first switch 160a may be used to turn the PID controller 150 on and/or off thereby acting as a power switch (see, e.g., FIG. 3B). In some implementations, the second switch 160b may be used to manually turn the combustion air blower on and/or off (see, e.g., FIG. 3B).

For controlling the temperature within the cooking chamber 110, a PID controller 150 is superior to a simple thermostat such as those found in many electric ovens. A simple thermostat would cause the combustion air blower 158 to continuously run until the cooking chamber 110 reached the set-point temperature. Once the set-point temperature was reached, the air blower 158 would be turned off leaving the solid fuel (e.g., charcoal briquettes) burning very hot. The temperature within the cooking chamber 110 would continue to rise even without fresh combustion air entering the fire box chamber 130. This could result in the internal temperature within the housing 105 remaining above the set-point temperature long enough for the solid fuel to because starved of oxygen and thereby extinguished. As a result, the cooking chamber 110 would be subjected to undesirable, extreme temperature swings.

FIG. 4 illustrates a rear side view of the vertical smoker and cooker 100 shown in FIGS. 1 and 2 with the rear sidewall removed to reveal the interior of the housing 105, in particular, the cooking chamber 110, the firebox chamber 130, and the plurality of drip guides 142. In some implementations, the drip guides 142 may be positioned between the fire box chamber 130 and the cooking chamber 110. The drip guides 142 serve as the demarcation point between the fire box chamber 130 and the cooking chamber 110.

As shown in FIG. 4, in some implementations, the plurality of drip guides 142 may be organized into an array that is mounted within the housing 105, under the food racks 114. In this way, the drip guides 142 may be arranged to catch and direct the flow of meat drippings away from the burning embers and into a collection pail 135 positioned within the fire box chamber 130. The drip guides 142 are discussed in greater detail below.

As shown in FIG. 4, in some implementations, the collection pail 135 may be positioned within the fire box chamber 130 for easy removal and clean up. In some implementations, the collection pail 135 may be a container configured to capture liquids and other debris. In some implementations, the collection pail 135 may be made from a metal or another heat resistant material suitable for use with a vertical smoker and cooker 100.

As shown in FIG. 4, in some implementations, an ash pan 136 may be positioned within the fire box chamber 130 underneath the fire box 138. In this way, ash from the fire box 138 may be collected and removed from the interior of the housing 105.

As shown in FIGS. 4 and 8, in some implementations, fresh combustion air B enters the lower portion of the fire box chamber 130 through an air diffuser 164 after exiting the metal tube 162 that is in communication with the combustion air blower 158. The air diffuser 164 is configured to slow the velocity of air being forced therethrough by the air blower 158. In some implementations, the combustion air B flows between the ash pan 136, the fire box 138, and the wood chip trays 139 positioned within the fire box chamber 130 (see, e.g., FIGS. 4 and 8). In some implementations, the combustion air B flows through holes 141 in the divider 140 located within the interior of the fire box chamber 130 and thereby cools the liquid drippings in the collection pail 135 (see, e.g., FIGS. 4 and 8). In some implementations, a portion of the fresh combustion air B is pulled up as a result of the thermal activity occurring within each of the drip guides 142 (see, e.g., FIG. 8).

As shown in FIG. 4, the divider 140 located within the fire box chamber 130 may be configured to support and retain a second end of each drip guide 142.

Figure 5:
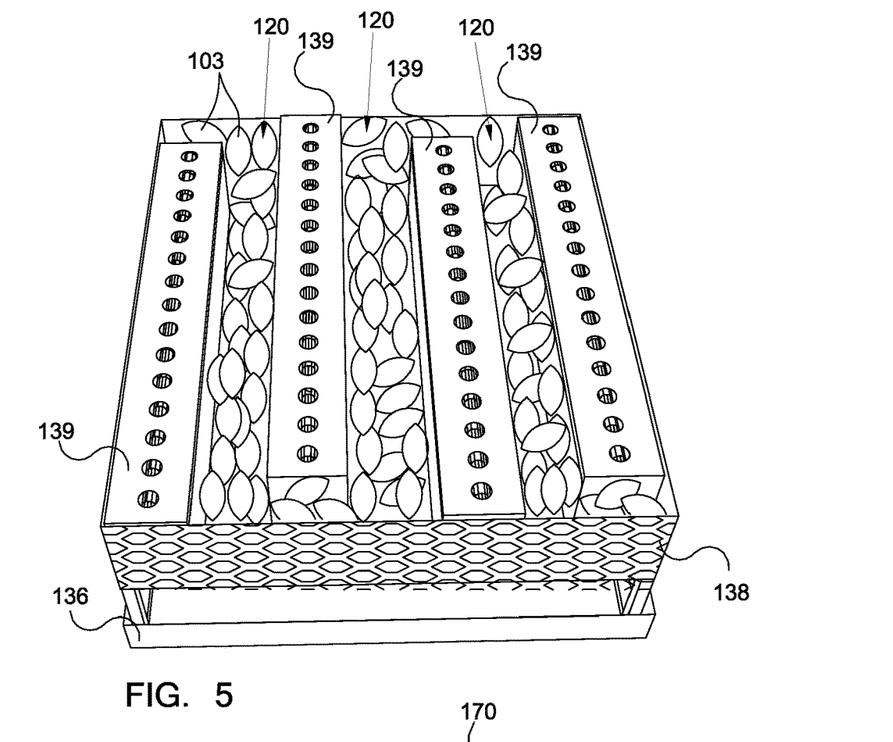
FIG. 5 illustrates an example fire box assembly according to the principles of the present disclosure.

As shown in FIG. 5, in some implementations, the fire box 138 is configured to hold charcoal briquettes or other solid fuel, as well as the four wood chip trays 139. In some implementations, the bottom and sidewalls of the fire box 138 may be made of a heavy expanded metal (see, e.g., FIG. 5). In some implementations, the bottom and sidewalls of the fire box 138 may be made of course wire. In some implementations, the fire box 138 may be made of any material offering sufficient structural support, that facilitates air flow through the bottom and sidewalls thereof, and is otherwise suitable for use with a vertical smoker and cooker 100. In some implementations, there may be more than four, or less than four, wood chip trays 139 positioned within the fire box 138.

As shown in FIG. 5, in some implementations, the fire box 138 defines a channel 120 therein that is configured to contain charcoal briquettes and/or another solid fuel source. In some implementations, the channel 120 may be formed between the bottom and sidewalls of the fire box 130 and the sidewalls of the wood chip trays 139 positioned therein (see, e.g., FIG. 5). In some implementations, the channel 120 may have a serpentine shape (see, e.g., FIG. 5). In some implementations, igniting one or more pieces of solid fuel 103 (e.g., charcoal briquettes) positioned in a first end of the channel 120 initiates a chain reaction in which adjacent pieces of solid fuel 103 will ignite in a slow and orderly manner as fresh combustion air B is introduced into the fire box chamber 130.

Figures 6A, 6B:
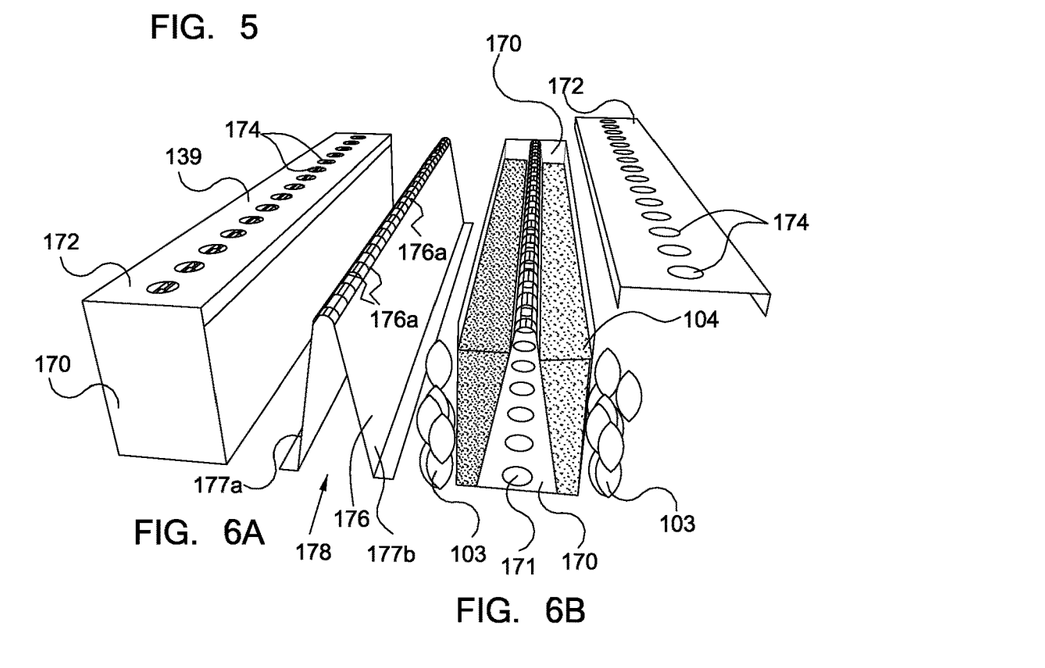
FIG. 6A illustrates a wood chip tray according to the principles of the present disclosure.
FIG. 6B illustrates an exploded view of the wood chip tray shown in FIG. 6A.

As shown in FIGS. 6A and 6B, in some implementations, each wood chip tray 139 may comprise a housing 170, a wood chip divider 176, and a removable lid 172.

In some implementations, the bottom and four sidewalls of a housing 170 define a narrow channel configured to receive a wood chip divider 176 therein. In some implementations, a plurality of air holes (e.g., 15) extend through the bottom of the housing 170 (see, e.g., FIG. 6B).

As shown in FIG. 6B, in some implementations, each wood chip divider 176 may include a first angled sidewall 177a and a second angled sidewall 177b. In some implementations, a wood chip divider 176 may have the general cross-sectional profile of an inverted "V" (see, e.g., FIG. 6B). In some implementations, a wood chip divider 176 may be made of a thin metal sheet. In this way, heat may be rapidly transferred from the wood chips 104 into the interior cavity 178 located between the first and second angled sidewalls 177a, 177b of the wood chip divider 176.

As shown in FIG. 6B, in some implementations, when positioned within a housing 170, the divider may be configured to form a first trough and a second trough into which wood chips 104 may be placed (see, e.g., FIG. 6B). In some implementations, the first trough and the second trough may be formed between an interior portion of the housing 170 and the first angled sidewall 177a or the second angled sidewall 177b, respectively (see, e.g., FIG. 6B).

In some implementations, as solid fuel (e.g., charcoal briquettes) positioned along at least one sidewall of the housing 170 of a wood chip tray 139 burns, heat is conducted through the sidewall of the wood chip tray 139, through the wood chips 104 positioned in the first and/or second trough, and through the divider 176. In some implementations, as the air within the interior cavity 178 of the divider 176 heats up, cooler air is pulled up into the cavity 178 as the warmer air exits through the plurality of openings 176a that extend through the apex of the divider 176 (see, e.g., FIG. 8). In this way, the wood chips 104 may be prevented from combusting (i.e., catching fire).

In some implementations, the first and second angled sidewalls 177 of each wood chip divider 176 may be configured to keep and position the wood chips 104 against the inside of the wood chip tray housing 170. In this way, the wood chips 104 may be positioned between the sidewalls of the housing 170 and the divider 176 (see, e.g., FIG. 6B). In some implementations, heat generated from burning solid fuel (e.g., charcoal briquettes) within the fire box 138 will dry the wood chips 104 out causing them to settle. In some implementations, the angled sidewalls 177 of the divider 176 may keep the wood chips 104 evenly distributed within each trough of the wood chip tray 139.

As shown in FIGS. 6A and 6B, in some implementations, the lid 172 for a wood chip tray 139 may include a plurality of air holes 174 therethrough. In some implementations, the air holes 174 may be offset to partially or completely cover the plurality of openings 176a through the apex of the divider 176. In this way, the temperature within the wood chip tray 139, and thereby the wood chips 104, may be increased when smoking foods at lower temperatures.

Figures 7A, 7B, 7C:
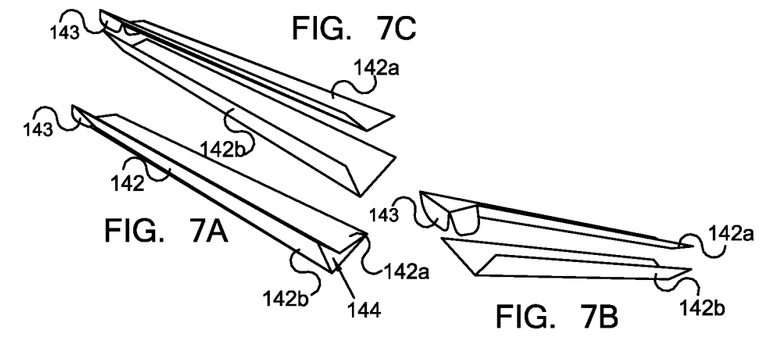
FIG. 7A illustrates a perspective view of a drip guide assembly according to the principles of the present disclosure.
FIGS. 7B and 7C illustrate exploded views of the drip guide assembly shown in FIG. 7A.

As shown in FIGS. 7A-7C, in some implementations, each drip guide 142 comprises a top portion 142a and a bottom portion 142b that are configured to form a hollow tube when assembled.

In some implementations, the top portion 142a of a drip guide 142 may be an elongated "V" shaped metal member. In some implementations, a first end of the top portion 142a may be turned down (or bent) to form two lips 143 (see, e.g., FIG. 7B). In some implementations, a hanger positioned on the inside of the housing 105 may be configured to receive the lips 143 extending from the first end of the top portion 142a (see, e.g., FIG. 4). In this way, the first end of each drip guide 142 may be supported and retained within the interior of the housing 105.

In some implementations, the top portion 142a of a drip guide 142 may be configured to catch and channel meat drippings falling thereon into the collection pail 135 positioned within the fire box chamber 130 (see, e.g., FIG. 4). In some implementations, the juncture between the two sidewalls of the top portion 142a form a channel configured to catch and direct the flow of meat drippings (see, e.g., FIG. 7A).

In some implementations, the bottom portion 142b of a drip guide 142 may be an elongated "V" shaped metal member. In some implementations, the angle between the sidewalls of the bottom portion 142b is smaller than the angle between the sidewalls of the top portion 142a. In this way, the bottom portion 142b has a deeper "V" shape when compared to the "V" shape of the top portion 142a (see, e.g., FIG. 7A).

As shown in FIG. 7A, in some implementations, each drip guide 142 includes a hollow passage 144 therethrough. In some implementations, the hollow passage 144 is formed when the top portion 142a and the bottom portion 142b of a drip guide 142 are joined together along their outer edges. In some implementations, the shape and size of the hollow passage 144 is a result of the different angles between the sidewalls of the top portion 142a and the bottom portion 142b of a drip guide 142 (see, e.g., FIG. 7A). In some implementations, the hollow passage 144 of each drip guide 142 has an opening at each end thereof. In this way, heated air and/or smoke may travel up and through the hollow passage 144. In some implementations, the direct radiant heat generated from burning solid fuel (e.g., charcoal briquettes) below a drip guide 142 creates a chimney effect therein that draws heated air and/or smoke up into and through the hollow passage 144.

In some implementations, the chimney effect created by the construction and positioning of each drip guide 142 serves to draw cooler air from the lower portion of the housing 105, through the hollow passage 144, thereby cooling the top portion 142a of a drip guide 142. In this way, the top portion 142a of a drip guide 142 may be prevented from reaching the smoke point temperature and/or the flash point temperature of the meat drippings falling thereon.

In some implementations, as air flows from the upper end of the drip guides 142 it creates turbulence within the interior cooking chamber 110 (see, e.g., FIG. 8). In this way, through convection, the heated air is able to evenly distribute throughout the cooking chamber 110.

Figures 7D, 7E:
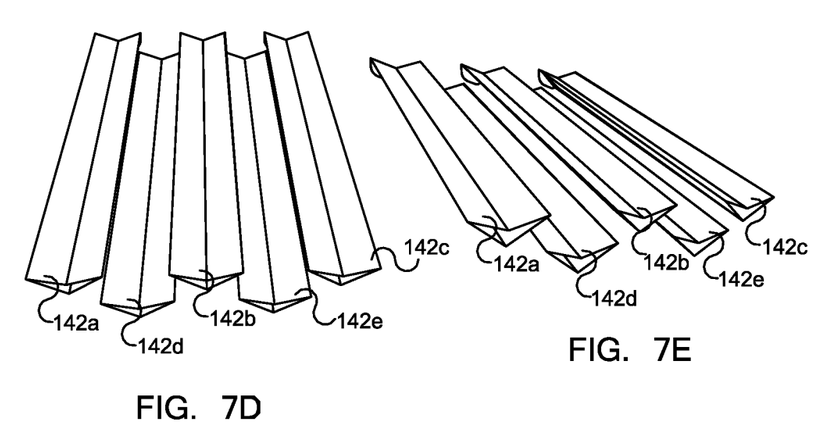
FIGS. 7D and 7E illustrate a plurality of drip guides organized into an array according to the principles of the present disclosure.

As shown in FIGS. 7D and 7E, in some implementations, the plurality (e.g., 142a, 142b, 142c, 142d, 142e) of drip guides 142 may be organized as an array that is configured to prevent the contents of the cooking chamber 110 from being exposed to the direct radiant heat coming from the fire box 138 and simultaneously prevent meat drippings from falling onto the burning embers positioned thereunder. Further, in some implementations, the array of drip guides 142 does little to hinder or otherwise prevent the natural rise of heat from the fire box 138, between the individual drip guides 142, to the cooking chamber 110.

In some implementations, each drip guide 142 may be positioned within the interior of the housing 105 at a 23 to 35 degree angle relative to the base of the vertical smoker and cooker 100.

As shown in FIG. 7D, in some implementations, an array of drip guides 142 may be organized into a first row having a first drip guide 142a, a second drip guide 142b, and a third drip guide 142c, and a second row having a fourth drip guide 142d and a fifth drip guide 142e. In some implementations, the first row of drip guides (i.e., 142a, 142b, 142c) may be positioned above the second row of drip guides (i.e., 142d, 142e) within the housing 105 of a vertical smoker and cooker 100. In some implementations, at least one outer edge of each drip guide (e.g., 142a, 142b, 142c) in the first row is positioned to overlap at least one outer edge of a drip guide (e.g., 142d, 142e) in the second row. In this way, because there are no gaps that extend through both rows of drip guides 142, meat drippings from the cooking chamber 100 can not fall into the firebox chamber 130.

FIG. 8 illustrates the thermal air flow within the interior of the vertical smoker and cooker 100. The arrows and letters shown are being used to illustrate each stage of thermal air movement within the housing 105 of a vertical smoker and cooker 100.

As shown in FIG. 8, in some implementations, cool combustion air A may be forced through the metal pipe 162, out of the diffuser 164, and into the lowest portion of the fire box chamber 130 by the combustion air blower 158.

Then, as shown in FIG. 8, the combustion air B is diffused so that it flows gently across the bottom portion of the fire box chamber 130, below the fire box 138. In order to minimize the buildup of heat in the fire box chamber 130, in some implementations, the bottom (or floor) of the housing 105/fire box chamber 130 is not insulated. In this way, the fire box chamber 130 may be kept as cool as possible.

Next, after a first portion of the solid fuel (e.g., charcoal briquette(s) within the fire box 138 is ignited, the heat and oxygen cause the adjacent pieces of solid fuel to ignite until all of the solid fuel is burning or exhausted. The rate at which adjacent pieces of solid fuel are ignited is controlled by the amount of combustion air being supplied by the combustion air blower 158.

Then, as shown in FIG. 8, as the air is heated by the burning solid fuel, cooler combustion air is rapidly pulled through the hottest areas of the fire box 138. The heated air and smoke C flows up through and above the fire box 138. Heat that is conducted to the center of each wood chip divider 140 causes a thermal lift which serves to pull heated air and smoke C through the wood chip trays 139. The heated air and smoke C then rises into the cooking chamber 110 where it is cooled by thermal loading of the food items being cooked and/or smoked therein. Stated another way, the heat C from the burning embers within the fire box 138 indirectly cooks and/or smokes the food items positioned within the cooking chamber 110.

Next, as shown in FIG. 8, in some implementations, a portion of the heated air and smoke E flows down from the cooking chamber 110 and is pulled into the lower opening of the hollow passage 144 of a drip guide 142 and therein mixes with a portion of the cooler combustion air B. As this mixture of air and smoke B, E moves through the drip guides 142 it is heated by the direct radiant heat D coming from the burning solid fuel. Heating the air and smoke B, E creates a chimney effect within each drip guide 142. This chimney effects causes heated air and smoke F to exit the upper opening of each drip guide 142 and create convection induced turbulence within the cooking chamber 110. The movement of air and smoke through the drip guides 142 also serves to cool the top portion 142a thereof.

As shown in FIG. 8, in some implementations, the array of drip guides 142 prevents the internal cooking chamber 110 from being exposed to the direct radiant heat D being produced by the burning embers located thereunder.

As shown in FIG. 8, excess hot air and smoke G is released through the exhaust pipe 109 in the upper portion of the cooking chamber 110. In this way, pressure within the housing 105 is reduced as combustion air A is introduced into the fire box chamber 130.

To further analyze the thermal dynamics of the present invention one must understand the concept of thermal energy within a semi-closed environment and the three types of heat energy.

Radiation: Carries heat in all directions from the burning solid fuel source (e.g., charcoal briquettes). The vertical smoker and cooker 100 disclosed herein is configured so that much of the radiated heat is blocked by: the walls of the wood chip trays 139 that are in contact with the burning solid fuel, and the non-burning solid fuel on the leading side. The trailing side of the burning solid fuel has less radiation because the outside of the solid fuel pieces has turned to ashes. Much of the radiation which goes up towards the cooking chamber 110 is blocked by the lower portion 142b of the drip guides 142. The drip guides 142 are configured so that convection air flow is created. This convection air flow F exits the drip guides 142 into the cooking chamber 110 near an inner wall thereof, just below the lower food rack 114a (see, e.g., FIG. 8). The heated air and smoke F then flows up and across the entire cooking chamber 110. The heated air and smoke will start to cool as a result of thermally loading any food items positioned within the cooking chamber 100. The cooler air E will flow downward, where it is pulled into the lower end of a drip guide 142, this process is repeated throughout the cooking duration (see, e.g., FIG. 8).

Conduction: Transfers heat from the solid burning fuel, through the outer walls of the wood chip trays, through the wood chips, and into the interior cavity 178 of a wood chip divider 176. The air within the interior cavity 178 heats up, then cooler air from below moves into the cavity to push the warmer air out through the plurality of openings 176a positioned along the apex of the divider 176. Convection airflow through the wood chip divider 176 prevents the wood chips from reaching ignition temperature thereby creating a more flavorful smoke.

Convection: Is created when air is heated and dense cool air from below moves in to force the less dense heated air upward. The fire box 138 is most efficient when turbulence is kept to a minimum and heat is allowed to rise as quickly as possible into the cooking chamber 110. Efficiency is improved by restricting turbulence to the lower portion of the fire box chamber 130 (e.g., below the fire box 138) and by allowing fresh combustion air to settle therein as much as possible. This reduces the amount of cool air entering the cooking chamber 110. Cool air can dry out food, which is undesirable.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown, or in sequential order, or that all illustrated operations be performed, to achieve desirable results.

The invention claimed is:

1. A vertical smoker and cooker for food comprising:
a housing having a cooking chamber accessible through a first door, a fire box chamber accessible through a second door, and a plurality of drip guides positioned between the cooking chamber and the fire box chamber, each drip guide is a hollow tube comprised of a top portion and a bottom portion;
at least one food rack positioned within the cooking chamber;
a fire box positioned within the fire box chamber, the fire box is configured to contain a solid fuel source therein;
a collection pail positioned within the fire box chamber; and
a divider that is positioned within the fire box chamber, the divider has holes therein through which air flows to cool the collection pail and is configured to support one end of each drip guide;
wherein the plurality of drip guides are organized as an array, the array of drip guides is configured to prevent food items placed into the cooking chamber from being exposed to direct radiant heat coming from the fire box; and
wherein the top portion of each drip guide is an elongated "V" shaped metal member that is configured to catch and channel meat drippings falling thereon into the collection pail positioned within the fire box chamber.

2. The vertical smoker and cooker of claim 1, wherein the bottom portion of each drip guide is an elongated "V" shaped metal member.

3. The vertical smoker and cooker of claim 1, wherein each drip guide includes a hollow passage therethrough, the hollow passage has an opening at each end thereof; wherein each drip guide is configured so that direct radiant heat from the fire box creates a chimney effect that draws air into and through the hollow passage.

4. The vertical smoker and cooker of claim 1, further comprising a proportional-integral-derivative (PID) controller that is configured to maintain a constant temperature within the cooking chamber; wherein the PID controller comprises a housing that includes a display, a thermocouple, a DC power supply, and a combustion air blower configured to introduce air into the fire box chamber of the housing.

5. The vertical smoker and cooker of claim 1, further comprising at least one wood chip tray that is positioned within the fire box, the at least one wood chip tray is configured to contain wood chips therein and prevent them from combusting during operation of the vertical smoker and cooker.

6. The vertical smoker and cooker of claim 5, wherein the at least one wood chip tray is comprised of a tray housing, a wood chip divider, and a removable lid; the tray housing is configured to receive the wood chip divider therein; the wood chip divider includes a first angled sidewall, a second angled sidewall, and a plurality of openings that extend through an apex of the wood chip divider; and the removable lid is configured to cover a top side of the tray housing and includes a plurality of air holes therethrough.

7. The vertical smoker and cooker of claim 6, wherein the wood chip divider is configured to form a first trough and a second trough when positioned within the housing of the at least one wood chip tray, each trough is configured for wood chips to be placed therein.

8. The vertical smoker and cooker of claim 5, comprises four wood chip trays positioned within the fire box; wherein the fire box defines a channel therein that is configured to contain the solid fuel source, the channel is formed between a bottom and sidewalls of the fire box and by sidewalls of the four wood chip trays positioned within the fire box.

9. The vertical smoker and cooker of claim 8, wherein the channel defined by the fire box has a serpentine shape.

10. The vertical smoker and cooker of claim 1, wherein the fire box defines a channel therein that is configured to contain the solid fuel source, the channel is configured so that igniting one or more pieces of solid fuel positioned in a first end thereof initiates a chain reaction in which adjacent pieces of solid fuel progressively ignite as fresh combustion air is introduced into the fire box chamber.

11. The vertical smoker and cooker of claim 10, wherein the channel defined by the fire box has a serpentine shape.

12. The vertical smoker and cooker of claim 1, wherein the housing further comprises an exhaust pipe that is in fluid communication with an upper portion of the cooking chamber.

13. The vertical smoker and cooker of claim 4, further comprising an air diffuser that is in communication with the combustion air blower, wherein the air diffuser is configured to slow the air coming from the combustion air blower prior to the air entering the fire box chamber.

14. A vertical smoker and cooker for food comprising:
a housing having a cooking chamber accessible through a first door, a fire box chamber accessible through a second door, and a plurality of drip guides positioned between the cooking chamber and the fire box chamber, each drip guide is a hollow tube comprised of a top portion and a bottom portion;
at least one food rack positioned within the cooking chamber;
a fire box positioned within the fire box chamber, the fire box is configured to contain a solid fuel source therein; and
four wood chip trays positioned within the fire box, each wood chip tray is configured to contain wood chips therein and prevent them from combusting during operation of the vertical smoker and cooker;
wherein the plurality of drip guides are organized as an array, the array of drip guides is configured to prevent food items placed into the cooking chamber from being exposed to direct radiant heat coming from the fire box; and
wherein the fire box defines a channel therein that is configured to contain the solid fuel source, the channel is formed between a bottom and sidewalls of the fire box and by sidewalls of the four wood chip trays positioned within the fire box.

15. The vertical smoker and cooker of claim 14, wherein the top portion of each drip guide is an elongated "V" shaped metal member that is configured to catch and channel meat drippings falling thereon into a collection pail positioned within the fire box chamber.

16. The vertical smoker and cooker of claim 15, wherein the bottom portion of each drip guide is an elongated "V" shaped metal member.

17. The vertical smoker and cooker of claim 15, further comprising a divider that is positioned within the fire box chamber, the divider has holes therein through which air flows to cool the collection pail and is configured to support one end of each drip guide.

18. The vertical smoker and cooker of claim 14, wherein each drip guide includes a hollow passage therethrough, the hollow passage has an opening at each end thereof; wherein each drip guide is configured so that direct radiant heat from the fire box creates a chimney effect that draws air into and through the hollow passage.

19. The vertical smoker and cooker of claim 14, further comprising a proportional-integral-derivative (PID) controller that is configured to maintain a constant temperature within the cooking chamber; wherein the PID controller comprises a housing that includes a display, a thermocouple, a DC power supply, and a combustion air blower configured to introduce air into the fire box chamber of the housing.

20. The vertical smoker and cooker of claim 19, further comprising an air diffuser that is in communication with the combustion air blower, wherein the air diffuser is configured to slow the air coming from the combustion air blower prior to the air entering the fire box chamber.

21. The vertical smoker and cooker of claim 14, wherein each wood chip tray is comprised of a tray housing, a wood chip divider, and a removable lid; each tray housing is configured to receive one wood chip divider therein; each wood chip divider includes a first angled sidewall, a second angled sidewall, and a plurality of openings that extend through an apex of the wood chip divider; and each removable lid is configured to cover a top side of one tray housing and includes a plurality of air holes therethrough.

22. The vertical smoker and cooker of claim 14, wherein the channel defined by the fire box has a serpentine shape.

23. The vertical smoker and cooker of claim 14, wherein the channel defined by the fire box is configured so that igniting one or more pieces of solid fuel positioned in a first end thereof initiates a chain reaction in which adjacent pieces of solid fuel progressively ignite as fresh combustion air is introduced into the fire box chamber.

24. The vertical smoker and cooker of claim 23, wherein the channel defined by the fire box has a serpentine shape.

25. The vertical smoker and cooker of claim 14, wherein the housing further comprises an exhaust pipe that is in fluid communication with an upper portion of the cooking chamber.

26. A vertical smoker and cooker for food comprising:
a housing having a cooking chamber accessible through a first door, a fire box chamber accessible through a second door, and a plurality of drip guides positioned between the cooking chamber and the fire box chamber, each drip guide is a hollow tube comprised of a top portion and a bottom portion;
at least one food rack positioned within the cooking chamber; and
a fire box positioned within the fire box chamber, the fire box is configured to contain a solid fuel source therein;
wherein the plurality of drip guides are organized as an array, the array of drip guides is configured to prevent food items placed into the cooking chamber from being exposed to direct radiant heat coming from the fire box; and wherein the fire box defines a channel therein that is configured to contain the solid fuel source, the channel has a serpentine shape and is configured so that igniting one or more pieces of solid fuel positioned in a first end thereof initiates a chain reaction in which adjacent pieces of solid fuel progressively ignite as fresh combustion air is introduced into the fire box chamber.

27. The vertical smoker and cooker of claim 26, wherein the top portion of each drip guide is an elongated "V" shaped metal member that is configured to catch and channel meat drippings falling thereon into a collection pail positioned within the fire box chamber.

28. The vertical smoker and cooker of claim 27, wherein the bottom portion of each drip guide is an elongated "V" shaped metal member.

29. The vertical smoker and cooker of claim 27, further comprising a divider that is positioned within the fire box chamber, the divider has holes therein through which air flows to cool the collection pail and is configured to support one end of each drip guide.

30. The vertical smoker and cooker of claim 26, wherein each drip guide includes a hollow passage therethrough, the hollow passage has an opening at each end thereof; wherein each drip guide is configured so that direct radiant heat from the fire box creates a chimney effect that draws air into and through the hollow passage.

31. The vertical smoker and cooker of claim 26, further comprising a proportional-integral-derivative (PID) controller that is configured to maintain a constant temperature within the cooking chamber; wherein the PID controller comprises a housing that includes a display, a thermocouple, a DC power supply, and a combustion air blower configured to introduce air into the fire box chamber of the housing.

32. The vertical smoker and cooker of claim 31, further comprising an air diffuser that is in communication with the combustion air blower, wherein the air diffuser is configured to slow the air coming from the combustion air blower prior to the air entering the fire box chamber.

33. The vertical smoker and cooker of claim 26, further comprising at least one wood chip tray that is positioned within the fire box, the at least one wood chip tray is configured to contain wood chips therein and prevent them from combusting during operation of the vertical smoker and cooker.

34. The vertical smoker and cooker of claim 33, wherein the at least one wood chip tray is comprised of a tray housing, a wood chip divider, and a removable lid; the tray housing is configured to receive the wood chip divider therein; the wood chip divider includes a first angled sidewall, a second angled sidewall, and a plurality of openings that extend through an apex of the wood chip divider; and the removable lid is configured to cover a top side of the tray housing and includes a plurality of air holes therethrough.

35. The vertical smoker and cooker of claim 33, comprises four wood chip trays positioned within the fire box; wherein the channel defined by the fire box is formed between a bottom and sidewalls of the fire box and by sidewalls of the four wood chip trays positioned within the fire box.

36. The vertical smoker and cooker of claim 26, wherein the housing further comprises an exhaust pipe that is in fluid communication with an upper portion of the cooking chamber.

* * * * *